United States Patent [19]

Meuschke et al.

[11] Patent Number: 4,849,158

[45] Date of Patent: Jul. 18, 1989

[54] METHOD FOR LIMITING MOVEMENT OF A THERMAL SHIELD FOR A NUCLEAR REACTOR, AND THERMAL SHIELD DISPLACEMENT LIMITER THEREFOR

[75] Inventors: Robert E. Meuschke, Penn Hills; Charles H. Boyd, Plum Borough, both of Pa.

[73] Assignee: Westinghouse Electric Corp., Pittsburgh, Pa.

[21] Appl. No.: 152,530

[22] Filed: Feb. 5, 1988

[51] Int. Cl.$^4$ .............................................. G21C 11/00
[52] U.S. Cl. ...................................... 376/285; 376/287
[58] Field of Search ................................ 376/285, 287

[56] References Cited

FOREIGN PATENT DOCUMENTS 3047769 7/1982 Fed. Rep. of Germany ...... 376/285

Primary Examiner—Deborah L. Kyle
Assistant Examiner—Richard W. Wendtland
Attorney, Agent, or Firm—M. G. Panian

[57] ABSTRACT

A method for limiting movement of a thermal shield of a nuclear reactor, and a thermal shield displacement limiter therefor, is provided where at least four and preferably six or more key-way inserts are positioned in pockets machined in the upper portion of a thermal shield, and bolted and doweled to the thermal shield. Each key-way insert is engaged by a limiter key that is bolted and doweled to the core barrel to tangentially restrain movement of the thermal shield relative to the core barrel, while allowing radial and axial movement to the thermal shield relative to the core barrel. Preferably, lock pins extend diametrically through the bolts and dial pins and engage the key-way insert and limiter key, respectively, to lock the bolts and dowels in position, and the engaging surfaces between the key-way inserts and the limiter keys are wear hardened.

6 Claims, 3 Drawing Sheets

METHOD FOR LIMITING MOVEMENT OF A THERMAL SHIELD FOR A NUCLEAR REACTOR, AND THERMAL SHIELD DISPLACEMENT LIMITER THEREFOR

FIELD OF THE INVENTION

This invention relates to nuclear reactors and more particularly to a method and apparatus for limiting the movement of the thermal shield of a nuclear reactor.

BACKGROUND OF THE INVENTION

Nuclear reactors are old and well-known in the art. Typically, the nuclear reactor has a nuclear core contained in a core barrel which is surrounded by a thermal shield designed to absorb the nuclear flux escaping from the nuclear core. The thermal shield is supported at circumferential points along its bottom and sides by the core barrel, but is radially spaced from the core barrel throughout most of its axial length. Because of the differential in temperature between the core barrel and thermal shield, these supports must be such as to provide for thermal contraction and expansion with temperature fluctuation during operation of the nuclear reactor.

The supports for the thermal shield have generally consisted of lower support blocks carrying most of the weight of the thermal shield, and upper displacement limiters toward the top of the shield designed to limit tangential movement of the shield relative to the core barrel. The lower supports are bolted and doweled to the core barrel, and the upper supports are keys extending through the thermal shield to engage grooves in spacer blocks positioned in the core barrel and the space between the core barrel and the thermal shield. These displacement limiters are designed to allow movement of the thermal shield relative to the core barrel typically of approximately 0.020 inch.

The difficulty is that with operation of the reactor the gaps in the displacement limiters have increased to up to as much as about 0.180 inch. These increased gaps in the displacement limiters cause fatigue and failure to the lower supports of the thermal shield jeopardizing continued safe reactor operation without repair.

SUMMARY OF THE INVENTION

The present invention provides a method of retrofitting existing nuclear reactors to limit the movement of the thermal shield relative to the core barrel. At least fourth, and preferably six or more, pockets are machined in upper portions of a thermal shield to receive key-way inserts. These pockets are circumferentially positioned about the core barrel of the nuclear reactor, preferably in equal segments along the circumference, to limit tangential movement of the thermal shield relative to the core barrel. After machining of the pockets, bolt holes are tapped in the thermal shield at the pockets to receive key-way inserts and the key-way inserts are positioned in the pockets of the thermal shield to be bolted in place with the bolt holes. Dowel holes are then machined at least partially through the positioned key-way inserts, and into and preferably through the thermal shield to receive dowel pins. The dowel pins are then positioned in the dowel holes in the key-way insert and thermal shield to tangentially restrain movement of the thermal shield relative to the core barrel.

Limiter keys are then slid into and engage the key-way inserts, and the limiter keys are then bolted with threaded bolt holes tapped in the core barrel. Each limiter key engages a key-way insert to allow for both radial and axial movement between them, thereby providing relief from thermal expansion or contraction of the core barrel relative to the thermal shield, while restraining tangential movement of the core barrel relative to the thermal shield. Preferably, the surfaces of engagement between each key-way insert and limiter key are wear hardened surfaces, e.g., Stellite TM, to reduce wear and maintain the restraint against tangential movement between the core barrel and thermal shield.

Thereafter, dowel holes are machined through the limiter keys and at least partially through the core barrel to receive dowel pins. The dowel pins are then positioned in the machined dowel holes in the limiter keys and core barrel to restrain tangential movement of the thermal shield relative to the core barrel. The bolt holes in the key-way insert and the limiter keys are preferably counter sunk to allow clearance for the assembly to be removed from the reactor vessel for maintenance.

Also, preferably, lock pins extend diametrically through the bolts and dowel pins to engage the key-way insert and the limiter key, respectively, to lock the bolts and dowel pins in place. Lock pins are hard, corrosion resistant steel, at least at their ends. They are curvilinear along their length, and positioned so that they can be straightened by impact through an axial opening in the head of the bolt or dowel pin. The curvilinearity of the lock pin is such that it is preferably about 0.060 inch larger when straightened than the diameter of the bolt or dowel pin at the lock pin's location, thereby providing for locking of the bolt or dowel pin in position.

The method as described above also provides for assembly of a thermal shield displacement limiter of the present invention.

Other details, objects and advantages of the invention will become apparent as the following description of the presently preferred embodiment and presently preferred method of practicing the same proceeds.

DESCRIPTION OF THE DRAWINGS

In the accompanying drawings, the presently preferred embodiments of the invention and presently preferred methods of practicing the invention are illustrated, in which.

DESCRIPTION OF THE PREFERRED EMBODIMENTS

Figure 1:
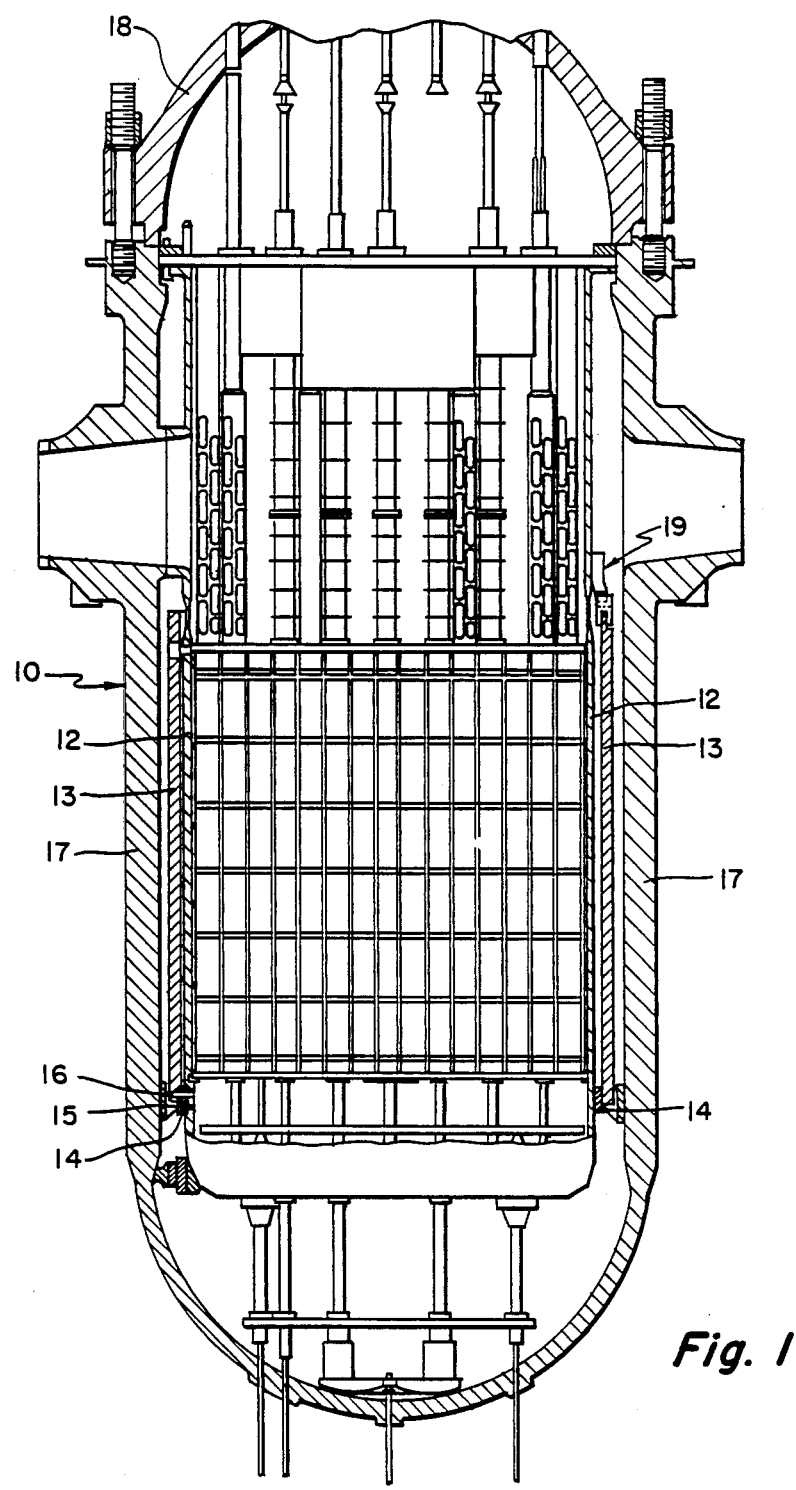
FIG. 1 is a perspective view of a nuclear reactor embodying a thermal shield displacement limiter of the present invention.

Referring to the drawings, nuclear reactor 10 has nuclear core 11 surrounded by core barrel 12. Spaced from and surrounding core barrel 12 is thermal shield 13 supported from the core barrel 12 by lower support blocks 14. Support blocks 14 are bolted and doweled to the core barrel by bolts and dowels 15 and 16, respectively. Thermal shield 13 absorbs nuclear flux escaping from the nuclear core 11.

The entire assembly is in turn enclosed within reactor vessel 17, but made so that top 18 of reactor vessel 17 can be removed and the entire internal assembly, including core barrel 12 and thermal shield 13, can be removed from reactor vessel 17 for periodic maintenance.

The thermal shield displacement limiter 19 of the present invention supports and restrains tangential movement of thermal shield 13 relative to core barrel 12, while allowing radial and axial movement of thermal shield 13 relative to core barrel 12. At least four and preferably at least six thermal shield displacement limiters 19 are circumferentially positioned preferably substantially equidistant about core barrel 12 for this purpose.

Figure 2:
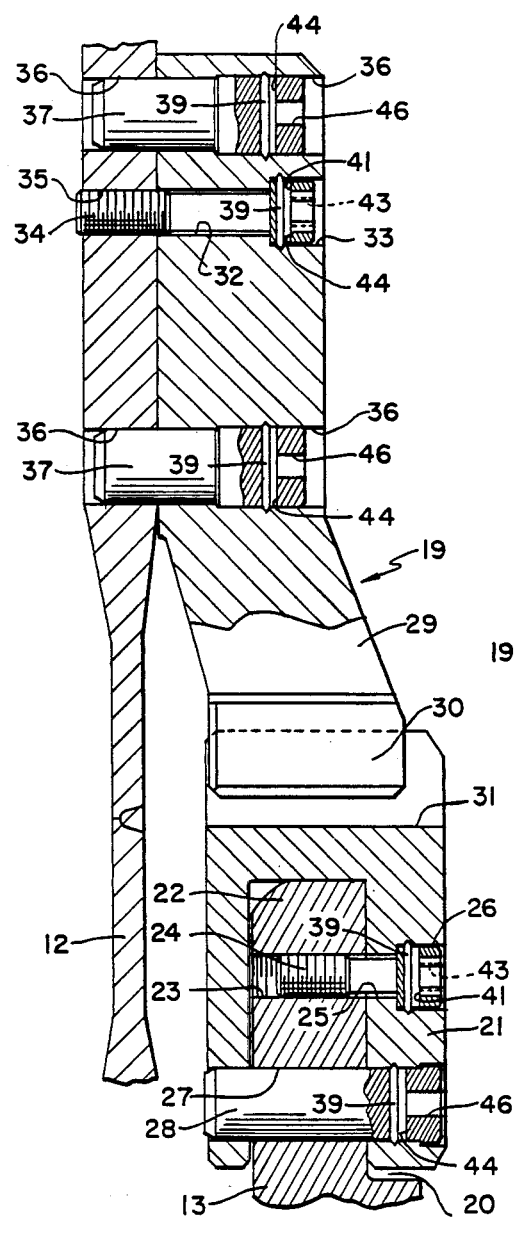
FIG. 2 is a cross-sectional fragmentary view of a part of a nuclear reactor showing a thermal shield displacement limiter of the present invention.
Figure 3:
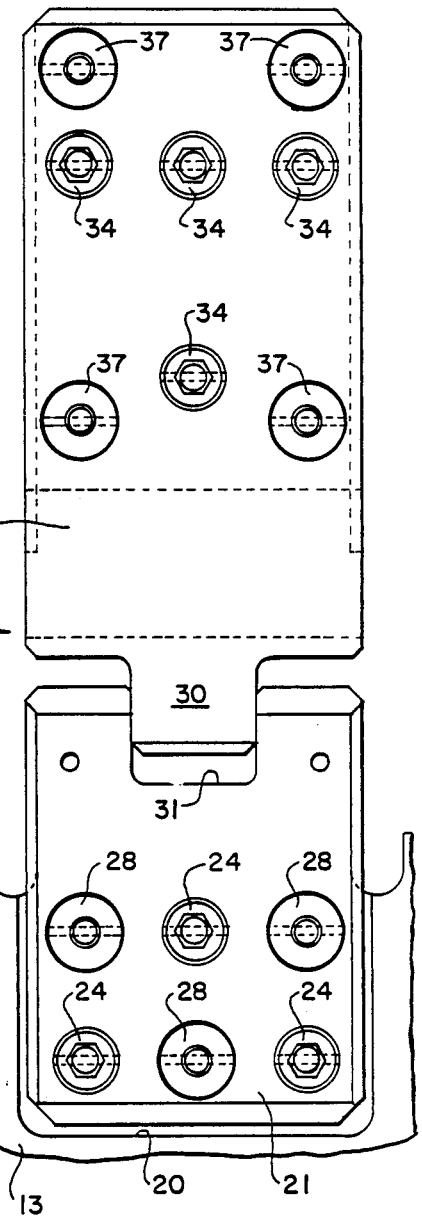
FIG. 3 is a fragmentary side view corresponding to FIG. 2 of a part of a nuclear reactor showing a thermal shield displacement limiter of the present invention.

Referring particularly to FIGS. 2 and 3, the thermal shield displacement limiters 19 are made by first machining pocket 20 circumferentially at at least four positions about core barrel 12 to receive key-way inserts 21, which extend over and enclose upper portions 22 of thermal shield 13 at pocket 20.

Bolt holes 23 are then tapped in pockets 20 of thermal shield 13 to receive bolts 24. Typically, three such bolt holes 23 and bolts 24 are used as shown in FIG. 3. Bolt holes 23 correspond to openings 25 in the key-way insert 21 through which bolts 24 are inserted and threaded into bolt holes 23. Openings 25 are countersunk into key-way insert 21 at 26 to allow for clearance of the bolts and in turn the assembly for removal from the reactor vessels 17 for maintenance.

After positioning key-way inserts 21 in pockets 20, dowel holes 27 are machined at least partially, and preferably entirely through positioned key-way inserts 21 and through thermal shield 13 to receive dowel pins 28 as shown in FIG. 2. Dowel pins 28 are then positioned in dowel holes 27 in key-way insert 21 and thermal shield 13 to tangentially restrain movement of the thermal shield 13 relative to core barrel 12. Dowel pins 28 are preferably positioned in dowel holes 27 against shoulders in holes 27 as shown in FIG. 2.

Limiter key 29 is then slid into each key-way insert 21. Each limiter key 29 has a key 30 designed to engage with close tolerance key groove 31 in key-way insert 21 to restrain tangential movement between core barrel 12 and thermal shield 13, while allowing radial and axial movement between key-way insert 21 and limiter key 29 and, in turn, core barrel 12 and thermal shield 13 with thermal expansion and contraction of the core barrel 12 and thermal shield 13. Also, preferably the engaging surfaces of key 30 of limiter key 29 and key groove 31 of key-way insert 21 are wear hardened surfaces, such as Stellite TM, to maintain the close tolerance and tangential restraint of thermal shield 13 relative to core barrel 12 with operation of the nuclear reactor. Limiter key 29 also has bolt holes 32, which are again countersunk at 33 to receive bolts 34. If not already present, bolt holes 35 are tapped in core barrel 12 to receive and thread bolts 34. Typically, at least about four threaded bolt holes 35 are provided in core barrel 12 to receive bolts 34 as illustrated in FIG. 3.

After limiter keys 29 are positioned and bolted with bolts 34 to core barrel 12, dowel holes 36 are machined through limiter key 29 and into and preferably through core barrel 12 to receive dowel pins 37. Dowel pins 37 are then positioned in dowel holes 36 through keyway inserts 21 and core barrel 12, and preferably rest against shoulders in dowel holes 36 as shown in FIG. 2. Again, the number of dowel holes 36 and dowel pins 37 utilized will depend upon the number needed to restrain tangential movement of the thermal shield relative to the core barrel of the nuclear reactor, typically four such dowel holes 36 and dowel pins 37 are appropriate as shown in FIG. 3.

Figure 4:
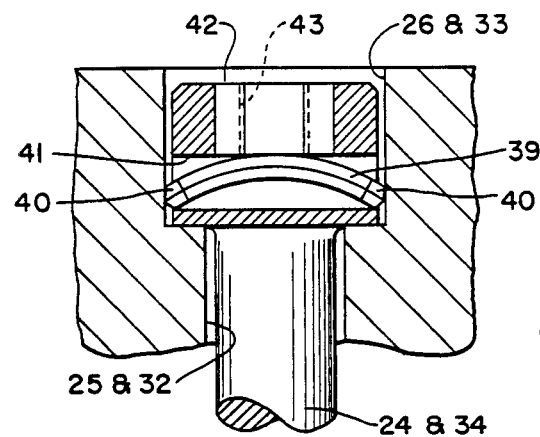
FIG. 4 is a fragmentary, cross-sectional view of a bolt of the thermal shield displacement limiter of the present invention, showing a lock pin as preferred in the present invention before locking in position.

Preferably, each bolt 24 and 34 is locked into position by lock pins 39 shown in detail in FIG. 4. Lock pins 39 have hard, corrosion resistant steel ends 40, such as Stellite TM. Lock pins 39 are curvilinear as shown in FIG. 4 and preferably about 0.060 inch larger than the countersunk portions 26 and 33 of bolt holes 25 and 32, respectively. The lock pins are positioned diametrically through openings 41 in bolts 24 and 34 with the curved portion toward the outer parts 42 of the heads of bolts 24 and 34. Bolts 24 and 34 also each have an opening 43 axially through the head to communicate with opening 41 and lock pin 39. When bolts 24 and 34 are positioned in torque with lock pins 39 in position as shown in FIG. 4, lock pins 39 are then impacted with a suitable instrument through openings 43 and straightened as shown in FIG. 2 to engage countersunk portions 26 and 41 of openings 25 and 32, respectively, and lock bolts 24 and 34 in position in key-way insert 21 and in limiter key 29, respectively.

Figure 5:
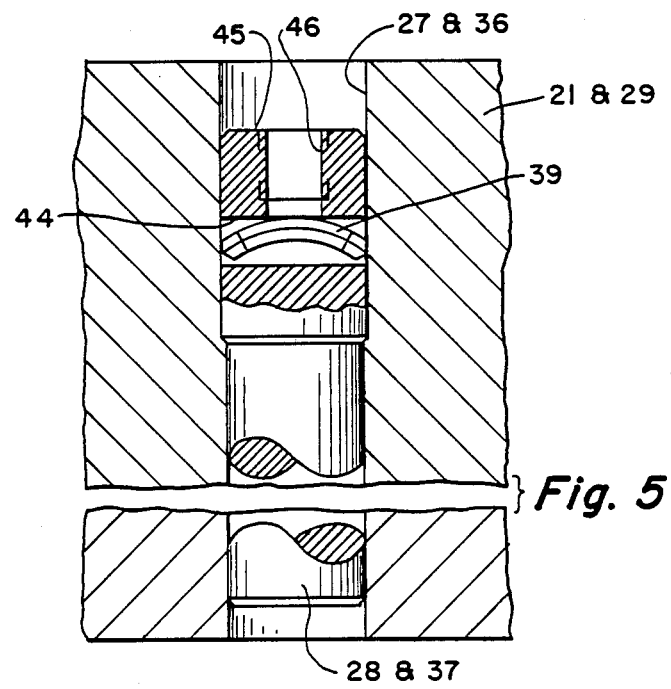
FIG. 5 is a fragmentary, cross-sectional view of a dowel pin of a thermal shield displacement limiter of the present invention, showing a lock pin as preferred in the present invention before locking in position.

Dowel pins 28 and 37 are also preferably locked in position by lock pins 39 as shown in detail in FIG. 5. Each dowel pin 28 and 37 has an opening 44 diametrically through it in which a lock pin 39 is positioned with its center part curved toward the outer end 45 of dowel pin 28 and 37. Each dowel pin 28 and 37 also has an axial opening 46 extending from end 45 to communicate with opening 44 and lock pin 39. With dowel pin 28 and 37 in position, as shown in FIGS. 2 and 3, the lock pins 39 are impacted with a suitable instrument through opening 46 to straighten them and engage openings 27 and 36, respectively, locking the dowel pins in position as shown in FIG. 2.

While the present preferred embodiments of the invention and methods for performing the same have been specifically described, it is distinctly understood that the invention may be otherwise embodied and used.

What is claimed is:

1. A method of limiting the movement of a thermal shield of a nuclear reactor comprising:
   a. machining at least four (4) pockets in upper portions of a thermal shield circumferentially about a core barrel of a nuclear reactor to receive key-way inserts;
   b. tapping bolt holes in the pockets of the thermal shield to receive bolts;
   c. positioning key-way inserts into the pockets of the thermal shield to be bolted in place with the bolt holes;
   d. machining dowel holes at least partially through the positioned key-way inserts and the thermal shield to receive dowel pins;

e. positioning dowel pins in the dowel holes in the key-way insert and thermal shield to tangentially restrain movement of the thermal shield relative to the core barrel;

f. sliding limiter keys into the key-way inserts and bolting the limiter keys to the core barrel to tangentially restrain movement of the thermal shield relative and the core barrel while allowing radial and axial movement of the thermal shield relative to the core barrel;

g. machining dowel holes through the limiter key and at least partially through the core barrel to receive dowel pins; and h. positioning dowel pins in the dowel holes in the limiter key and core barrel to restrain tangential movement of the thermal shield relative to the core barrel of the nuclear reactor.

2. A method of limiting movement of a thermal shield of a nuclear reactor as claimed in claim 1 wherein bolts and dowel pins are locked in position by lock pins extending diametrically through the bolts and dowel pins to engage the key-way insert and limiter key, respectively.

3. A method of limiting the movement of the thermal shield of a nuclear reactor as set forth in claim 1 wherein engaging surfaces between the key-way insert and the limiter key are wear hardened.

4. A thermal shield displacement limiter comprising:

a. a key-way insert positioned in pockets in upper portions of a thermal shield;

b. a limiter key engaging the key-way insert and the core barrel of a nuclear reactor to tangentially restrain movement of the thermal shield relative to the core barrel while allowing radial and axial movement of the core barrel relative to the thermal shield;

c. bolts fastening the key-way insert to the thermal shield and fastening the limiter key to the core barrel; and d. dowel pins positioned in holes extending through the key-way insert and into the thermal shield and through the limiter key and into the core barrel to restrain tangential movement of the thermal shield relative to the core barrel.

5. A thermal shield displacement limiter as claimed in claim 4 wherein lock pins extend diametrically through bolts and dowel pins and engaging the key-way insert and limiter key, respectively, to lock the bolts and dowel pins in position.

6. A thermal shield displacement limiter as claimed in claim 4 wherein engaging surfaces between the key-way insert and the key-way limiter are wear hardened.

* * * * *